United States Patent [19]

Nakajima et al.

[11] 4,055,785
[45] Oct. 25, 1977

[54] STEPPING MOTOR FOR ELECTRONIC TIMEPIECE

[76] Inventors: Fumio Nakajima, No. 5-3, 2-chome, Mejiro, Toshima, Tokyo; Takayasu Machida, No. 1562, Noda, Iruma, Saitama; Kenji Yamada, No. 9-19, 1-chome, Nakamachi, Koganei, Tokyo, all of Japan

[21] Appl. No.: 697,364

[22] Filed: June 18, 1976

[30] Foreign Application Priority Data

Jan. 12, 1976 Japan .................................. 51-2613
Feb. 26, 1976 Japan ................................. 51-20495

[51] Int. Cl.$^2$ ............................................ H02K 29/00
[52] U.S. Cl. .................................... 318/138; 318/696; 318/439; 310/49 R; 310/163
[58] Field of Search ............... 318/138, 254, 281, 289, 318/293, 431, 439, 696; 310/49 R, 40 MM, 163; 58/23 D

[56] References Cited

U.S. PATENT DOCUMENTS

| 3,344,378 | 9/1967 | Wilhelmson | 310/49 R X |
| 3,626,269 | 12/1971 | Stanley | 310/49 R X |
| 3,746,959 | 7/1973 | Kobayashi et al. | 318/696 |
| 3,984,972 | 10/1976 | Yoshimo | 310/40 MM |

Primary Examiner—Gene Z. Rubinson
Attorney, Agent, or Firm—Holman & Stern

[57] ABSTRACT

A stepping motor for an electronic timepiece comprises a permanent magnet rotor, a stator and a driving coil, having at least one static equilibrium point for the rotor. The driving coil is arranged to be energized by a current smaller than a driving current so that the stator is energized to required polarities of low flux intensity, whereby the static equilibrium point for the rotor is electromagnetically shifted to an arbitrary position to permit rotation of the rotor in any desired direction.

17 Claims, 18 Drawing Figures

STEPPING MOTOR FOR ELECTRONIC TIMEPIECE

This invention relates in general to stepping motors and, more particularly, to a reversible stepping motor for use in an electronic timepiece.

A conventional stepping motor for use in an electronic timepiece usually comprises two stator pole pieces which are either manufactured individually and displaced from each other with respect to the center of the radius of curvature of each stator pole piece during assembly, or are directly formed in one piece by press working such that the stator pole pieces are displaced from each other as in the first case. This asymmetric construction is necessary to enable rotation of the rotor in a required direction. Such a motor is unidirectional and typically rotates 180° per input stepping pulse.

Various types of reversible stepping motors have heretofore been proposed for electronic timepieces, to make it possible to correct time represented by members such as a seconds hand, minutes hand or hours hand. These motors are usually comprised of two driving coils and more than three stator pole pieces, resulting in a relatively large size. Where the stepping motor comprises a plurality of stator pole pieces overlapping each other, the construction is necessarily of increased thickness. In addition, the drive circuit will be relatively complicated, because of the necessity for generating four-phase pulses to drive the rotor.

To solve various problems encountered in the conventional stepping motors, a proposal has previously been made for an improved reversible stepping motor. This is generally comprised of two stator pole pieces, which are formed with indents at an inner periphery of each stator pole pieces whereby a rotor is stable on an axis of static equilibrium provided at a given angle with respect to a central axis between two stator pole pieces. With this arrangement, the rotor may be rotated in a required direction by applying drive pulses to a driving coil. Reverse rotation of the rotor can be achieved by controlling the supply of two-phase drive pulses to the driving coil. With this expedient, if the rotor poles and the phase of the drive pulse supplied to the driving coil fall out of correspondence, the rotor will rotate in the wrong direction. Consequently, this type of stepping motor is not suited for an electronic timepiece in which accurate correction is required for the hours hand, minutes hand or seconds hand.

It is, therefore, an object of the present invention to provide an improved stepping motor having at last one static equilibrium point which can be electromagnetically shifted to any desired position.

It is another object of the present invention to provide an improved stepping motor having at least one static equilibrium position which can be electromagnetically shifted to an arbitrary position to permit reverse rotation of a rotor.

It is still another object of the present invention to provide a control unit for a stepping motor adapted to electromagnetically shift a static equilibrium point to an arbitrary position to permit rotation of a rotor in a reverse direction.

It is a further object of the present invention to provide a control unit for a stepping motor by which a static equilibrium point is shifted to any arbitrary position within a range between 0 to ½ of one step of rotation of a rotor.

It is a further object of the present invention to provide a stepping motor including a driver circuit equipped with a low current supply circuit.

It is a still further object of the present invention to provide a stepping motor including a driver circuit equipped with a low current supply circuit adapted to energize a driving coil with a low current to shift a static equilibrium point to an arbitrary position.

It is a still further object of the present invention to provide a control unit for a stepping motor adapted to provide a burst of high frequency pulses to cause a low current to flow through a driving coil of the stepping motor whereby a static equilibrium point is electromagnetically shifted to an arbitrary position to permit rotation of a rotor in any desired direction.

These and other objects, features and advantages of the present invention will become more apparent from the following description when taken in conjunction with the accompanying drawings, in which.

Figure 1:
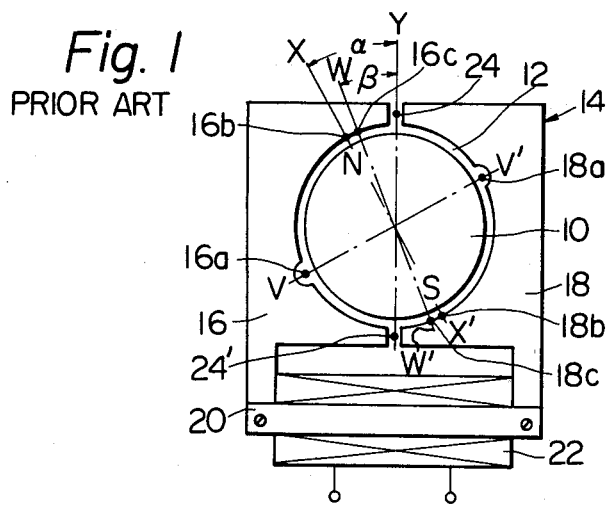
FIG. 1 is a schematic view of a prior art stepping motor.

Referring now to FIG. 1, there is shown an example of a prior art stepping motor for use in an electronic timepiece. As shown, the stepping motor is comprised of a permanent magnet rotor 10, which is mounted in an air gap 12 provided by a stator 14 such that it is free to rotate. The stator 14 comprises stator pole pieces 16 and 18, which are magnetically coupled to each other by a magnetically permeable elongated member 20. A driving coil 22 is wound around the magnetically permeable elongated member 20. The stator pole pieces 16 and 18 have indents 16a and 18a formed on an axis V-V' to provide maximum magnetic flux reluctance thereon. With this arrangement, the rotor 10 is stable on an axis X-X' of static equilibrium which intersects points 16b and 18b of the stator pole pieces 16 and 18, respectively, at an angle α with respect to the central axis Y–Y' of air gaps 24 and 24' between the stator pole pieces 16 and 18. Since the static equilibrium angle α is greater than the reversible rotational angle β on an axis W–W', the rotor 10 is rotatable only in one direction.

Figure 2A:
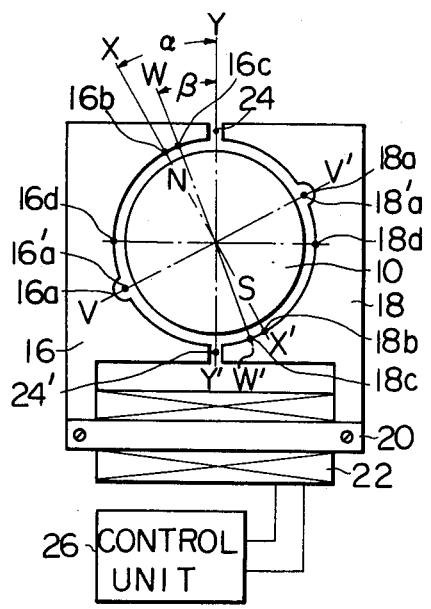
FIG. 2A is a schematic view of a preferred embodiment of a stepping motor according to the present invention and shows a rotor being rotated in its normal direction.
Figure 2B:
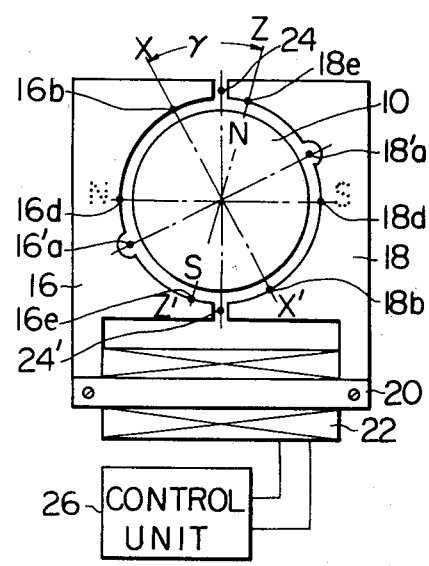
FIG. 2B is similar to FIG. 2A but shows a rotor being rotated in its reverse direction.

A preferred embodiment of the stepping motor according to the present invention is illustrated in FIGS. 2A and 2B, in which like or corresponding component parts are designated by the same reference numerals as those used in FIG. 1. In this illustrated embodiment, the driving coil 22 of the stepping motor is connected to a control unit 26 arranged to supply drive pulses to the driving coil 22 of the stepping motor to rotate the rotor 10 in a required direction. When it is desired to rotate the rotor 10 in a reverse direction, the control unit 26 supplies energizing current at a low level to the driving coil 22 to electromagnetically shift the static equilibrium position of the rotor 10 toward an arbitrary position, i.e., on an axis Z–Z' intersecting electromagnetically provided static equilibrium points 18d and 16d on the stator pole pieces 18 and 16, respectively. Thereafter, drive pulses having a polarity opposite to that of the energizing current is applied to the driving coil 22 and, thus, the rotor 10 is rotated in its reverse direction.

Figure 5:
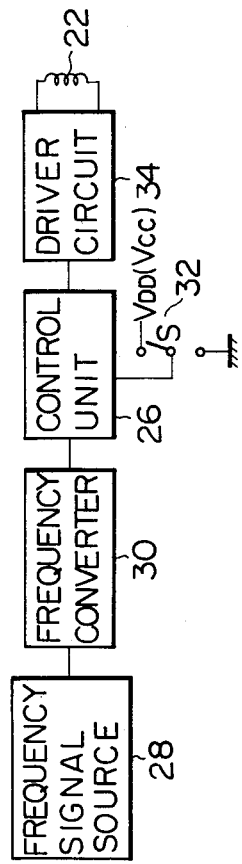
FIG. 5 is a block diagram of an electric circuitry for an electronic timepiece incorporating the stepping motor according to the present invention.

FIG. 5 shows a block diagram of electric circuitry for an electronic timepiece incorporating the control unit 26 mentioned above. The electronic timepiece comprises a frequency signal source 28 providing a higher frequency signal, a frequency converter 30 to generate a drive signal of low frequency, a control unit 26 connected to a control switch 32, and a driver circuit 34 connected to the control unit 26 and the driving coil 22 of the stepping motor.

Figure 6:
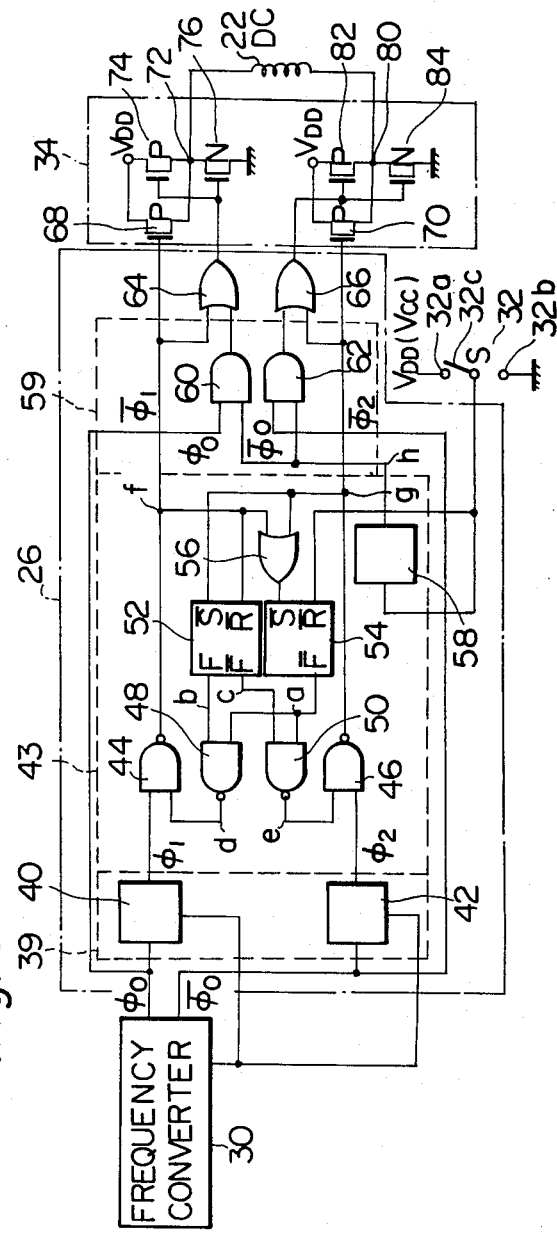
FIG. 6 is a detailed electric circuitry of a preferred example of a part of the block diagram shown in FIG. 5.
Figure 7:
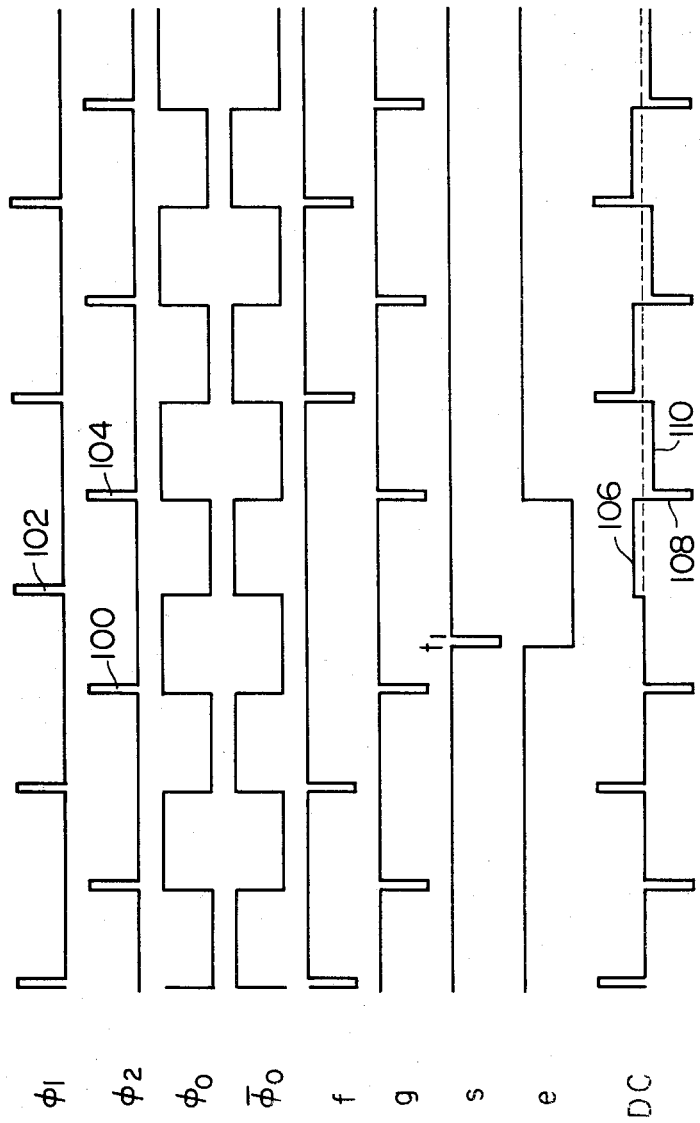
FIG. 7 shows waveforms of various pulses produced in the electric circuit shown in FIG. 6.

As shown in FIG. 6, the control unit 26 comprises a pulse generation circuit 39 including first and second flip-flops 40 and 42 connected to the frequency converter 30 to receive clock pulses $\phi o$ and $\overline{\phi o}$ of relatively high frequency as shown in FIG. 7. The first and second flipflops 40 and 42 may be data-type flip-flops having their clock terminals connected to an intermediate stage of the frequency converter 30 as shown in FIG. 6, and generate output pulses $\phi 1$ and $\phi 2$ of relatively low frequency as shown in FIG. 7. The control unit 26 also includes a first switching circuit 43 connected between the pulse generation circuit 39 and the driver circuit 34 for controlling the supply of output pulses thereto. As shown, the first switching circuit 43 comprises first and second NAND gates 44 and 46. The first NAND gate 44 receives at one of its inputs output pulses $\phi 1$ and receives at its other input an output d from a third NAND gate 48 to generate output pulses f as shown in FIG. 7. Likewise, the second NAND gate 46 receives at one of its inputs output pulses $\phi 2$ and also receives at its other input an output e from a fourth NAND gate 50 to generate output pulses g as shown in FIG. 7. The output f of the first NAND gate 44 is applied to a reset input of a flip-flop 52 and to a set input of a flip-flop 54 through an OR gate 56, which also forms part of the first switching circuit 43. Similarly, the output g of the second NAND gate 46 is applied to a set input of the flip-flop 52 and to the set input of the flip-flop 54 through the OR gate 56. A reset input of the flip-flop 54 is connected to the control switch 32. The control switch 32 has a stationary contact 32a connected to the positive power supply terminal Vdd, a stationary contact 32b connected to the ground side of the power supply, and a movable contact arm 32c which is normally held in engagement with the stationary contact 32a. An output b of the flip-flop 52 is connected to one input of the third NAND gate 48, to another input of which is applied output a of the flip-flop 54. The output a of the flip-flop 54 is also applied to the fourth NAND gate 50, to which output c of the flip-flop 52 is also applied. The output d of the third NAND gate 48 is applied to the first NAND gate 44 as previously decribed. The fourth NAND gate 50 provides an output e when the control switch 32 is actuated at the instant t1 as shown in FIG. 7, which is applied to the second NAND gate 46. The control switch 32 is also connected to a flip-flop 58, which generates an output h. The output h is applied to a second switching circuit 59 comprising first and second AND gates 60 and 62, to which the clock pulses $\phi o$ and $\overline{\phi o}$ of the frequency converter 30 are applied respectively. The first AND gate 60 has its output connected to an OR gate 64, to which the output f of the first NAND gate 44 is also applied. Similarly, the second AND gate 62 has its output connected to an OR gate 66, to which the output g of the second NAND gate 46 is also applied.

The driver circuit 34 comprises P-channel MOS transistors 68 and 70 for generating driving pulses of relatively high amplitude and having their gate terminals connected to receive the outputs f and g, respectively. The P-channel transistor 68 has its source terminal connected to a positive power supply Vdd and its drain terminal coupled to junction 72 between the drain terminals of a P-channel transistor 74 and an N-channel transistor 76. The P-channel transistor 74 has its source terminal coupled to the positive power supply Vdd and the source terminal of the N-channel transistor 76 is grounded. The gate terminals of the P-channel transistor 74 and the N-channel transistor 76 are coupled together as at 78 and connected to the output of the second OR gate 64. The junction 72 is coupled to one terminal of the driving coil 22. Similarly, the P-channel transistor 70 has its gate terminal coupled to the output of the second NAND gate 46 and its source terminal coupled to the positive power supply Vdd. The drain terminal of the P-channel transistor 70 is coupled to a junction 80 between drain terminals of a P-channel transistor 82 and an N-channel transistor 84. The gate terminals of the P-channel transistor 82 and the N-channel transistor 84 are coupled together at junction 80 and connected to the output of the third OR gate 66. The junction 80 is coupled to another terminal of the driver coil 22. The P-channel transistors 74 and 82 have relatively high output resistances.

Figure 8:
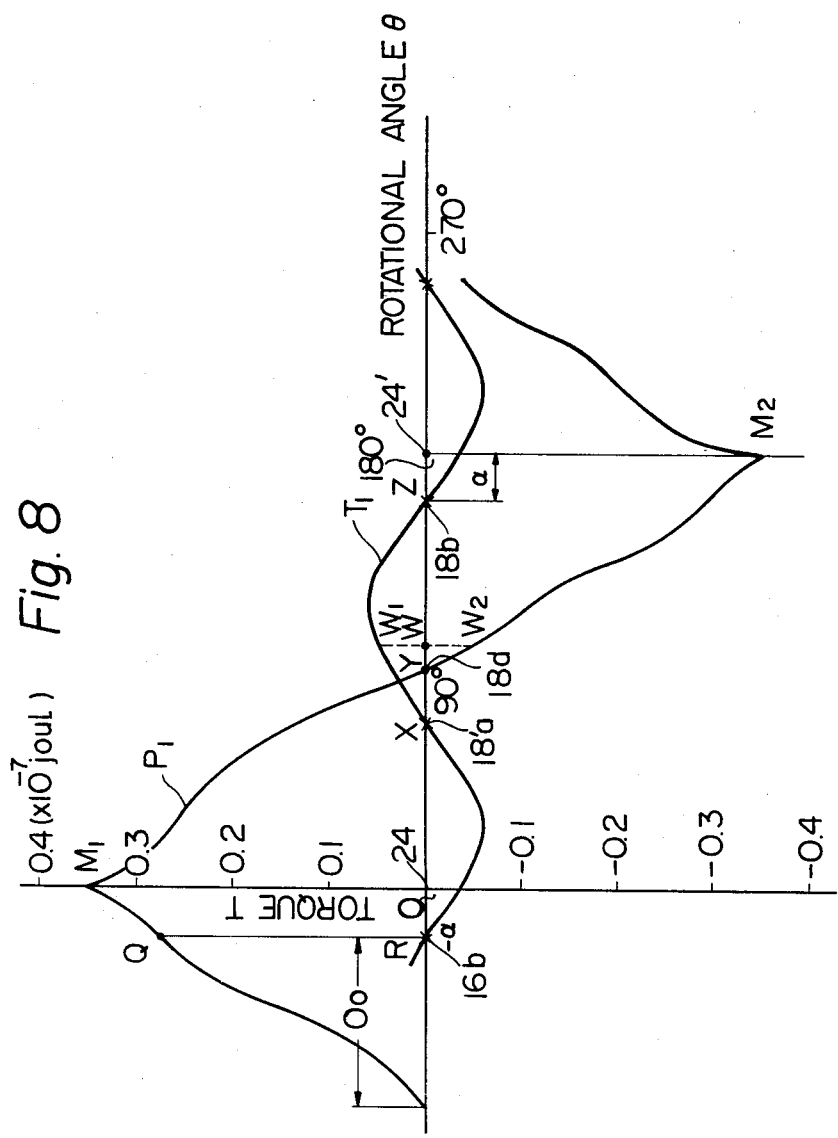
FIG. 8 is a torque diagram plotted in terms of rotational angle of the rotor in its normal direction of rotation.
Figure 9:
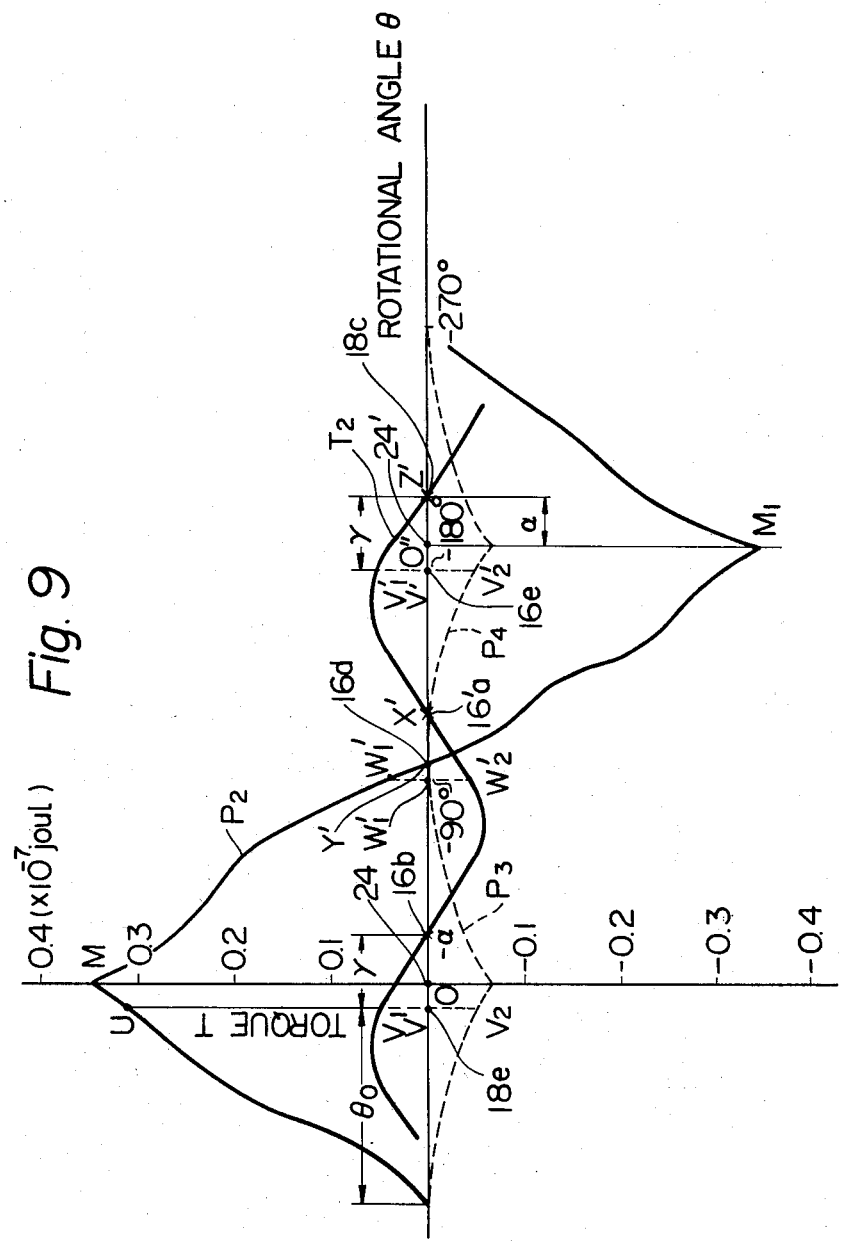
FIG. 9 is a torque diagram plotted in terms of rotational angle of the rotor in its reverse direction of rotation.

FIG. 8 shows a torque diagram plotted in terms of rotational angle of the rotor in its normal direction. In FIG. 8, P1 indicates driving power and T1 represents retaining torque caused by attraction forces of the stator pole pieces acting on the rotor. FIG. 9 shows a torque diagram plotted in terms of rotational angle of the rotor in its reverse direction. In FIG. 9, P2 indicates driving power, and P3 and P4 attraction torques caused by small amplitude pulses applied to the driving coil.

Figure 3A:
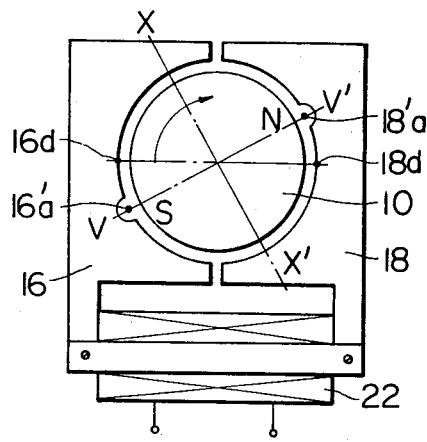
FIGS. 3A, 3B and 3C are views illustrating the state of the rotor being rotated in the normal direction.

As mentioned above, the movable contact arm 32c of the control switch 32 is normally held in contact with the stationary contact 32a connected to the positive power supply terminal. Under this condition, the output h of the flip-flop 58 is low so that the AND gates 60 and 62 are inhibited. Consequently, output pulses $\overline{\phi 1}$ and $\overline{\phi 2}$ from the AND gates 44 and 46 are applied to the driver circuit 34. In this instance, a $\phi 1$ pulses is first applied to the driving coil 22. At this instant, the stator pole piece 16 is energized to a north polarity and the stator pole piece 18 is energized to a south polarity. Under this condition, the north pole of the rotor 10 is repulsed by the north polarity of the stator pole piece 16 and attracted by the south polarity of the stator pole piece 18. At the same time, the south pole of the rotor 10 is repulsed by the south polarity of the stator pole piece 18 and attracted by the north polarity of the stator pole piece 16. Consequently, the rotor 10 is caused to rotate in a normal direction, i.e., clockwise, through an angle of 90°, from the stationary position shown in FIG. 2A to the stationary position shown in FIG. 3A. In FIG. 3A the north pole of the rotor 10 is aligned with axis V–V' intersecting the point 18'a. This condition corresponds to point X in FIG. 8, at which T1-0. The static equilibrium point 16b at which the north pole of the rotor 10 was previously stationary corresponds to point R in the torque diagram of FIG. 8. As shown in FIG. 8, the torque T1 applied to the rotor 10 has a positive value after the north pole of the rotor reaches the point 18'a in FIG. 3A, and consequently, the rotor 10 continues to rotate until its north pole is aligned with the axis X–X' which intersects the point 18b in FIG. 3A. This condition corresponds to the point Z in FIG. 8. It is to be noted in this instance that although the rotor 10 can be rotated to the position corresponding to the point X in FIG. 8 due to its kinetic energy, even if the application of the φ1 pulse to the driving coil 22 is interrupted before the north pole of the rotor 10 has reached the position corresponding to point X, it is desirable to set the width of the φ1 pulses in accordance with the load torque applied to the rotor 101. While the upper limit of the pulse width of the φ pulses being applied to the driving coil 22 is not restricted, since the sum of driving power P1 and the torque T1 is zero at point W(electromagnetic static point) which assumes operation within the positive range of the torque T1 in FIG. 8, and that the rotor 10 tends to rotate toward the point W. However it is desirable that the pulse width be set in the order of, for example, 16 milliseconds for the sake of minimizing power consumption.

Usually, the equation of motion of a reversible stepping motor using a permanent magnet rotor is expressed as follows:

$$J \cdot \frac{d^2\theta}{dt} + \mu \frac{d\theta}{dt} = A(\theta)i(t) - T(\theta) - \rho(\theta) \quad (1)$$

$$L \frac{di(t)}{dt} + A(\theta) \frac{d\theta}{dt} + Ri(t) = E \quad (2)$$

where
  $J$ = moment of inertia of the rotor
  $\mu$ = coefficient of dynamic resistance
  $A(\theta)$ = torque coefficient or coefficient of electromechanical coupling
  $T(\theta)$ = attractive force between the stator and the rotor
  $\theta$ = rotational angle of the rotor
  $i(t)$ = driving current
  $L$ = inductance of the driving coil of the stepping motor
  $R$ = resistance of the driving coil of the stepping motor
  $E$ = biasing voltage
  $\alpha$ = phase angle of the attractive force T with respect to the
  center line of the gaps between the stator pole pieces
  $\rho(\theta)$ = load torque.

The coefficient of the electromechanical coupling and the attractive force of the stepping motor used in the electronic timepiece are usually expressed in terms of the center line of the air gaps between the stator pole pieces as follows:

$$A(\theta) = Ao \sin(\theta + 2/\pi) \ldots \quad (3)$$

$$T(2\theta + \alpha) = To \sin(2\theta + \alpha) \ldots \quad (4)$$

$$P = A(\theta)i(t) = Ao \sin(\theta + 2/\pi) \cdot i(t) \ldots \quad (5)$$

where $P$ = driving torque.

Figure 3B:
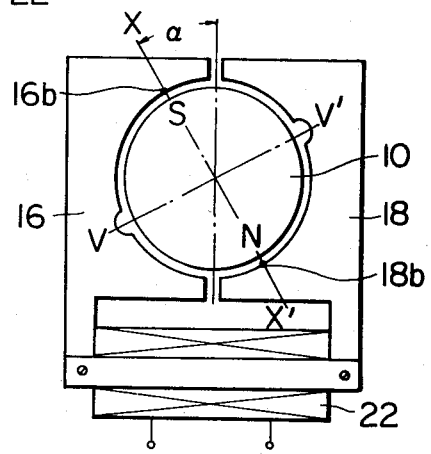

When a φ1 pulse is applied to the driving coil 22, the rotor 10 is rotated 180° from the position shown in FIG. 2A to the position shown in FIG. 3B as previously described. In this condition, the north pole of the rotor 10 becomes stationary after slightly damped vibration on the axis X–X' of static equilibrium intersecting the point 18b in FIG. 3B, corresponding to the point Z in FIG. 8. This is due to the fact that the factor μ in the above equation (1) is relatively small. If this factor μ is made sufficiently large, it may be possible to critically brake the rotor 10.

Figure 3C:
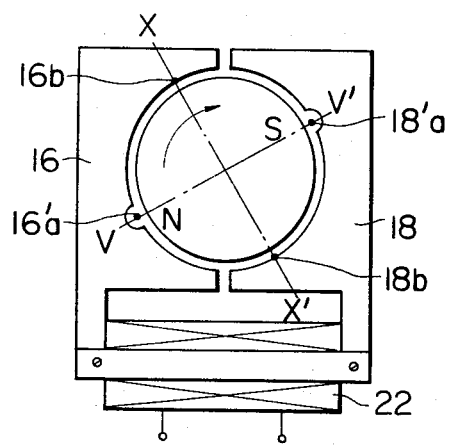

Assume that, in the state of the rotor 10 shown in FIG. 3B, one of the φ2 pulses shown in FIG. 7 is applied to the driving coil 22. In this instance, the stator pole piece 16 is energized to a south polarity and the stator pole piece 18 is energized to a north polarity as shown in FIG. 3C. Under this condition, the north pole of the rotor 10 is repulsed by the north polarity of the stator pole piece 18 and attracted by the south polarity of the stator pole piece 16. At the same time, the south pole of the rotor 10 is repulsed by the south polarity of the stator pole piece 16 and attracted by the north polarity of the stator pole piece 18. Consequently, the rotor 10 is rotated in the normal direction, i.e., clockwise until the poles of the rotor 10 are aligned with the static equilibrium axis X–X' as shown in FIG. 2A. Subsequently, if the pulses φ1 and φ2 are alternately applied to the driving coil 22, the rotor 10 continues to rotate in the normal direction.

Turning now to FIG. 6, the movable contact arm 32c of the control switch 32 is normally held in contact with the positive power supply terminal as previously mentioned. In this instance, the flip-flop 54 is reset, and the output a of the slip-flop 54 becomes low, thereby inhibiting the NAND gates 48 and 50. Accordingly, the outputs d and e of the NAND gates 48 and 50 become high, enabling the NAND gates 44 and 46 to pass the input pulses φ1 and φ2. The outputs $\overline{\phi1}$ and $\overline{\phi2}$ of the NAND gates 44 and 46 are supplied to the driver circuit 34. When these pulse are absent, the gate terminals of the MOS transistors 76 and 84 go to the high level and these transistor thereby go to the conducting state. Both terminals of the driving coil 22 are therefore clamped to the zero level. Assume that a $\overline{\phi1}$ pulse is applied to the driver circuit 34. In this condition, the pulse $\overline{\phi1}$ is applied directly to the gate terminal of the P-channel transistor 68 which is consequently rendered conducting. The $\overline{\phi1}$ pulse is also applied through the OR gate 64 to the gate terminals of the P-channel transistor 74 and the N-channel transistor 76. The P-channel transistor 74 rendered conducting, and the N-channel transistor 76 non-conducting. Since, in this condition, the transistors 74 and 82 have resistances greater than the resistance of the driving coil 22, the driving current flows through the transistor 68, the junction 72, the driving coil 22, and the junction 80 to the transistor 84. Similarly, if the pulse $\overline{\phi 2}$ is applied to the gate terminals of the transistors 70, 82 and 84, the transistors 70 and 82 are rendered conductive and the transistor 84 non-conductive. Therefore, the driving current will flow through the transistor 70, the junction 80, the driving coil 22, and the junction 72 to the transistor 76. In this manner, if trains of pulses $\overline{\phi 1}$ and $\overline{\phi 2}$ are applied to the driver circuit 34, the rotor 10 of the stepping motor is caused to rotate in the normal direction as already mentioned hereinabove.

When the movable contact arm 32c of the control switch 32 is brought into contact with the stationary contact 32b connected to the grounded side of the power supply at the time instant t1 as shown in FIG. 7, the output a of the flip-flop 54 becomes high. Since, at this time, the output b of the flip-flop 52 is high in response to the input pulse 100 ($\phi 2$) applied prior to the time instant t1, the output d of the NAND gate 48 is low, thereby inhibiting the NAND gate 44. Accordingly, the next pulse 102 of the pulse train $\phi 1$ is inhibited by the NAND gate 44. Since, on the other hand, the output h of the flip-flop 58 is high, the AND gates 60 and 62 are opened. The clock pulses $\phi o$ and $\overline{\phi o}$ are thereby gated through the AND gates 60 and 62, and applied through the OR gate 64 and 66 to the driver circuit 34. At this instant, the clock pulse $\phi o$ is applied to the gate terminals of the transistors 74 and 76 of the driver circuit 34. Accordingly, the transistor 74 is rendered conductive, and the transistor 76 non-conductive. Thus, a low voltage signal designated by 106 in FIG. 7 is applied to the driving coil 22 of the stepping motor. In this condition, the stator pole piece 16 is energized to a north polarity of low flux intensity, and the stator pole piece 18 is energized to a south polarity of low flux intensity when the rotor 10 is stationary on the static equilibrium axis X'-X as shown in FIG. 2A. Consequently, the north pole of the rotor 10 is repulsed by the slightly energized north polarity of the stator pole piece 16 and attracted by the slightly energized south polarity of the stator pole piece 18. At the same time, the south pole of the rotor 10 is repulsed by the slightly energized south polarity of the stator pole piece 18 and attracted by the slightly energized north polarity of the stator pole piece 16. Accordingly, the rotor 10 is caused to rotate in the normal direction, i.e., clockwise from the first static equilibrium position shown in FIG. 2A to the second static equilibrium position of the axis Z-Z' in FIG. 2B. In this position the north pole of the rotor 10 is aligned with the point 18e of FIG. 2B, corresponding to the point V in FIG. 9 wherein the sum of driving power P3 caused by the low voltage signal applied to the driving coil 22 and the torque T2 is zero. At this point, the rotor 10 is stationary on the second static equilibrium axis Z-Z'.

Figure 4A:
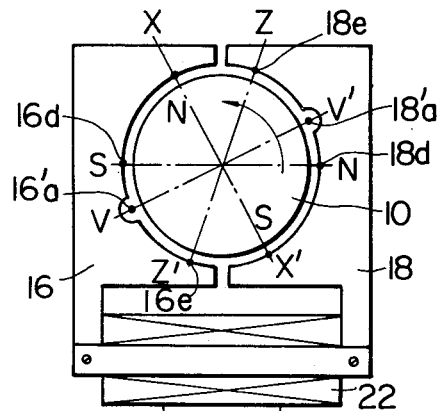
FIG. 4A, 4B and 4C are views illustrating the state of the rotor being rotated in the reverse direction.

Since, on the other hand, the output c of the flip-flop 52 is low, the output e of the NAND gate 50 is high, opening the NAND gate 46. Consequently, a $\phi 2$ clock pulse is gated through the NAND gate 46 to provide output pulse $\overline{\phi 2}$ designated as 104 in FIG. 7. This $\overline{\phi 2}$ output pulse is applied to the flip-flop 54, which is consequently reset. Thus, the output a of the flip-flop 54 becomes low and the output d of the NAND gate 48 becomes high, enabling the NAND gate 44 to pass a $\phi 1$ clock pulse. Consequently, if the pulse $\overline{\phi 2}$ is applied to the driving coil 22 when the rotor 10 is stationary on the second static equilibrium axis Z-Z' as shown in FIG. 2B, the stator pole piece 16 is energized to a south polarity, and the stator pole piece 18 is energized to a north polarity. In this instance, the north pole of the rotor 10 is repulsed by the north polarity of the stator pole piece 18 and attracted by the south polarity of the stator pole piece 16. At the same time, the south pole of the rotor 10 is repulsed by the south polarity of the stator pole piece 16 and attracted by the north polarity of the stator pole piece 18. Accordingly, the rotor 10 is forced to rotate in the reverse direction, i.e., counterclockwise as shown in FIG. 4A. The driving power P2 acting on the rotor 10 will be zero when its north pole reaches the point 16d in FIG. 4A, i.e., the point Y' in FIG. 9. However, the rotor 10 still continues to rotate in the reverse direction because of its kinetic energy overcoming the opposing attraction force acting on the rotor 10. Thus, the rotor 10 will reach the point X' in FIG. 9 in which torque T2=0, and still continue to rotate due to its kinetic energy and the positive torque acting on it, to the next static equilibrium position. It should be noted that the lower limit of the duration of the driving pulse may be determined in the same manner as in the case of rotating the rotor 10 in its normal direction. However, since the sum of the driving power P2 and the torque T2 is zero at the point W1' in FIG. 9 and, in this case, the torque T2 is in a negative range, a larger pulse width of the driving pulse will cause the rotor to return to the point W1' during the application of the driving pulse, and the rotor tends to return to its initial static equilibrium 16b or 18d in FIG. 9 when the supply of driving pulse is stopped. Consequently, it is desirable that the pulse width of the driving pulse be selected not to be extremely large. In this case, the pulse width of the driving pulse is preferably less than 16 milliseconds.

If the supply of the $\phi 2$ pulse designated as 104 in FIG. 7 is interrupted, the north pole of the rotor 10 goes beyond the point X' in FIG. 9. Since, in this instance, the clock pulse $\overline{\phi o}$ is applied to the gate terminals of the transistors 82 and 84 of the driver circuit 34, the transistor 82 becomes conductive and the transistor 84 becomes nonconductive. Consequently, a low voltage signal designated as 110 in FIG. 7 is applied to the driving coil 22 of the stepping motor. In this condition, the stator pole piece 16 is energized to a south polarity of low flux density and the stator pole piece 18 is energized to a north polarity of low flux density, as shown by broken-line symbols S and N in FIG. 4B. Under this circumstance, the sum of the driving power P2 caused by the small magnitude of driving current applied to the driving coil 22 and the torque T2 is zero at the point V' in FIG. 9, corresponding to the static equilibrium point 16d in FIG. 4B at which the north pole of the rotor 10 is static. If, in this situation, a $\phi 1$ clock pulse is applied to the driving coil 22, the stator pole piece 16 is energized to a north polarity and the stator pole piece 18 is energized to a south polarity. At this instant, the north pole of the rotor 10 is repulsed by the north polarity of the stator pole piece 16 and attracted by the south pole of the stator pole piece 18. At the same time, the south pole of the rotor 10 is repulsed by the south polarity of the stator pole piece 18 and attracted by the north polarity of the stator pole piece 16. Thus, the rotor 10 is forced to rotate in the reverse direction through 180°, to the position shown in FIG. 2B. In this manner, the rotor 10 is rotated in the reverse direction by the clock pulses alternately applied to the driving coil 22.

Figure 10:
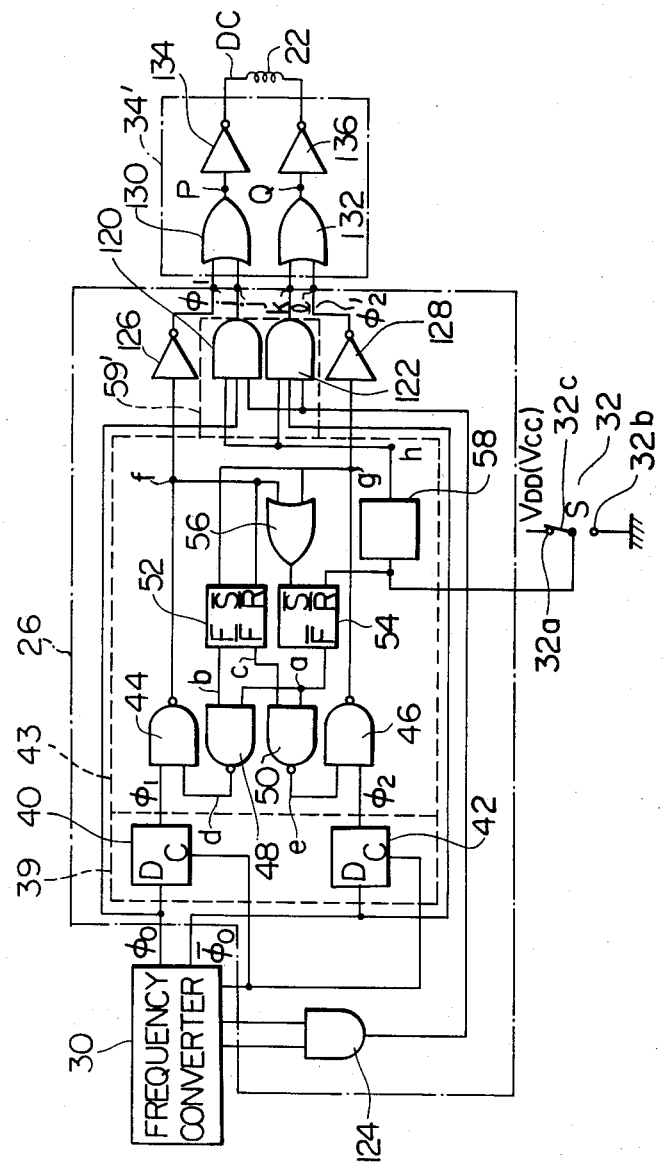
FIG. 10 is a detail electric circuitry of a second preferred example of a part of the block diagram shown in FIG. 5.
Figure 11:
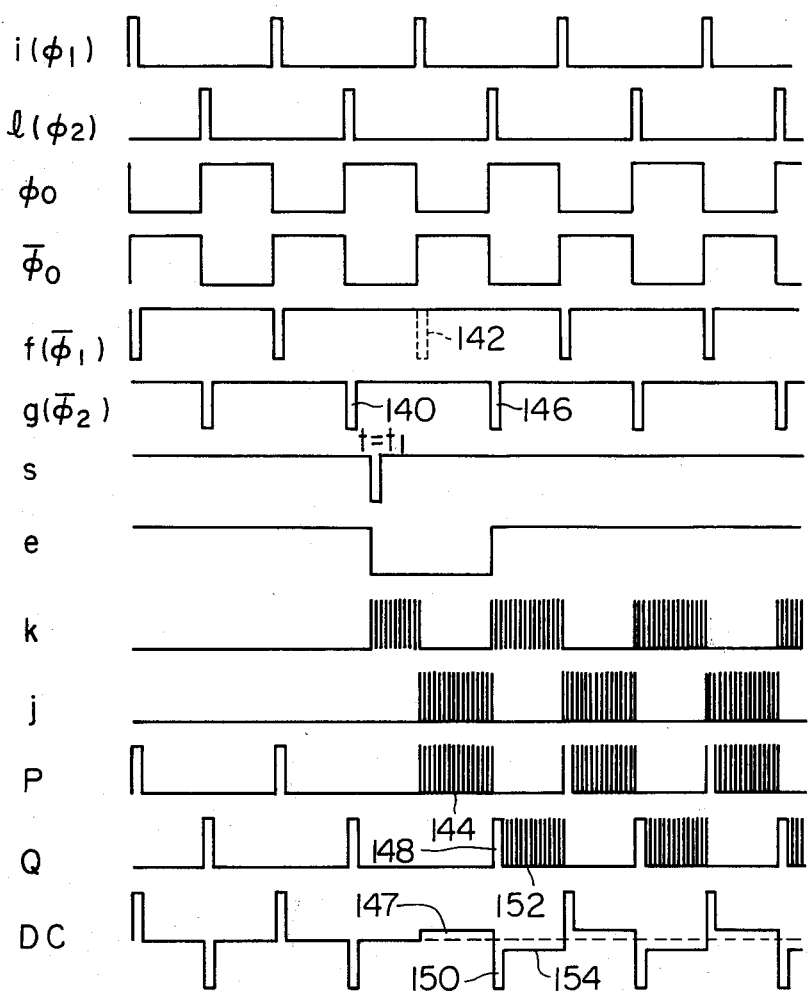
FIG. 11 is a waveform diagram of various pulses produced in the electric circuit shown in FIG. 10.

Another preferred embodiment of a control unit is illustrated in FIG. 10, in which like or corresponding component parts are designated by the same reference numerals as those used in FIG. 6. In this illustrated emobdiment, the second switching means 59' comprises a first and second AND gates 120 and 122. The first AND gate 120 has three inputs connected to the output of the frequency converter 30, the output of the flip-flop 58 and an output of a higher frequency pulse generating gate 124 having its inputs coupled to intermediate stages of the frequency converter 30. The first AND gate 120 has its output J coupled to the driver circuit 34'. Similarly, the second AND gate 122 has three inputs coupled to the output of the frequency converter 30, the output of the flip-flop 58 and the output of the higher frequency pulse generating gate 124. The second AND gate 122 has its output $k$ coupled to the driver circuit 34'. The second switching means 59' thus arranged is responsive to the output $h$ from the flip-flop 58 to generate a burst of higher frequency pulses J and k as shown in FIG. 11 for energizing the stator of the stepping motor to required polarities of low flux intensity as will be described in detail. These burst signals are applied to the driver circuit 34', to which $\phi1$ and $\phi2$ pulses from inverters 126 and 128 are also applied. The driver circuit 34' comprises a first and second OR gates 130 and 132, and inverters 134 and 136 coupled to outputs of the OR gate 130 and 132. The first OR gate 130 has two inputs coupled to the output of the AND gate 120 and the inverter 126 to receive outputs $i$ and J therefrom, respectively, for generating an output $p$ as shown in FIG. 11. Likewise, the second OR gate 132 has two inputs coupled to the output of the AND gate 122 and the inverter 128 to receive output $k$ and $l$ therefrom, respectively, for generating an output Q as shown in FIG. 11.

In operation, the movable contact arm 32c of the control switch 32 is normally held in contact with the stationary contact 32a connected to the positive power supply terminal. Under this condition, the output h of the flip-flop 58 is low so that the AND gates 120 and 122 of the second switching means 59' are inhibited. At the same time, the output a of the flip-flop 54 is low and, therefore, the outputs $d$ and $e$ of the NAND gates 48 and 50 become high, thereby enabling the NAND gates 44 and 46 to pass the input pulses $\phi1$ and $\phi2$. The outputs $f$ and $g$ are inverted by the inverters 126 and 128 and applied to the inputs of the OR gates 130 and 132 of the driver circuit 34', generating alternating driving pulses. These driving pulses are applied to the driving coil 22 so that the rotor is rotated in the normal direction as shown in FIGS. 3A to 3C.

Figure 12A:
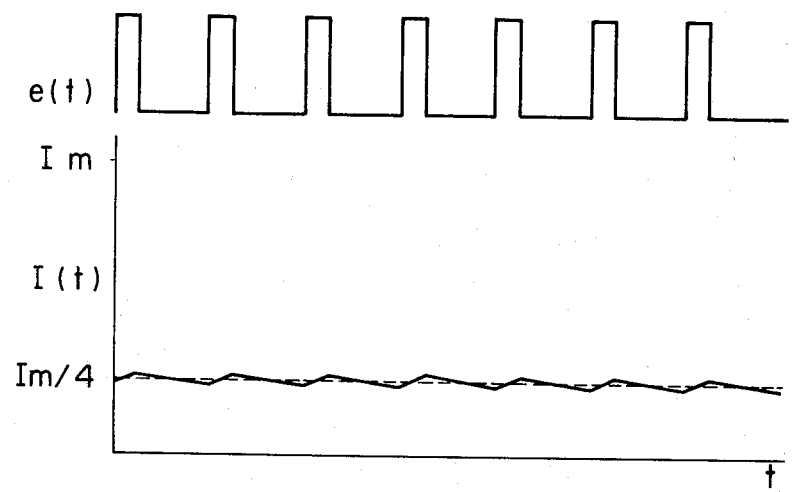
FIGS. 12A and 12B are graphs illustrating the relationship between enlarged portions of high frequency pulses applied to a driving coil of the stepping motor shown in FIG. 2 and an average current flowing therethrough.

When the movable contact 32c of the control switch 32 is brought into contact with the stationary contact 32b connected to the ground side of the power supply at the time instant $t1$ as shown in FIG. 11, the output a of the flip-flop 54 becomes high. Since, at this time, the output $b$ of the flip-flop 52 is high in response to the input pulse $g$ ($\overline{\phi2}$) applied prior to the time instant $t1$, the output d of the NAND gate is low, thereby inhibiting the NAND gate 44. Accordingly, the next pulse 142 of the pulse train $f$ ($\phi1$) is inhibited by the NAND gate 44. Since, on the other hand, the output h of the flip-flop 58 is high, the AND gates 120 and 122 of the second switching means 59' are opened. The clock pulses $\phi o$ and $\overline{\phi o}$ and the output of the AND gate 124 are thereby gated through the AND gates 120 and 122 to provide outputs J and k as shown in FIG. 11. Enlarged portions of these outputs are indicated by $e(t)$ in FIG. 12A. At this instant, only the output J is applied to one of the inputs of the OR gate 130 and it generates an output $p$ as designated by 144 in FIG. 11. This output is applied through the inverter 134 to the driving coil 22 of the stepping motor. In this condition, a driving current 147 flows through the driving coil 22 so that the stator pole piece 16 is energized to a north polarity of low flux intensity, and the stator pole piece 18 is energized to a south polarity of low flux intensity when the rotor 10 is stationary on the static equilibrium axis X–X' as shown in FIG. 2A. Consequently, the north pole of the rotor 10 is repulsed by the slightly energized north polarity of the stator pole piece 16 and attracted by the slightly energized south polarity of the stator pole piece 18. At the same time, the south pole of the rotor 10 is repulsed by the slightly energized south polarity of the stator pole piece 18 and attracted by the slightly energized north polarity of the stator pole piece 16. Accordingly, the rotor 10 is caused to rotate in the normal direction, i.e., clockwise from the first static equilibrium position shown in FIG. 2A to the second static equilibrium position of the axis Z–Z' shown in FIG. 2B at which the rotor 10 is stationary.

Since, on the other hand, the output c of the flip-flop 52 is low, the output e of the NAND gate 50 is high, opening the NAND gate 50 is high, opening the NAND gate 46. Consequently, a $\phi2$ clock pulse is gated through the NAND gate 46 to provide output pulses $\overline{\phi2}$ designated as 146 in FIG. 11. This $\overline{\phi2}$ output pulse is applied to the flip-flop 54, which is consequently reset. Thus, the output a of the flip-flop 54 becomes low and the output d of the NAND gate 48 becomes high, enabling the NAND gate 44 to pass a $\phi1$ clock pulse. Consequently, if the pulse $\overline{\phi2}$ designated as 148 in FIG. 11 is applied to the driving coil 22 when the rotor 10 is stationary on the second static equilibrium axis Z–Z' as shown in FIG. 2B, a driving current 150 flows through the driving coil 22 so that the stator pole piece 16 is energized to a south polarity, and the stator pole piece 18 is energized to a north polarity. In this instance, the north pole of the rotor 10 is repulsed by the north polarity of the stator pole piece 18 and attracted by the south polarity of the stator pole piece 16. At the same time, the south pole of the rotor 10 is repulsed by the south polarity of the stator pole piece 16 and attracted by the north polarity of the stator pole piece 18. Accordingly, the rotor 10 is forced to rotate in the reverse direction, i.e., counter-clockwise as shown in FIG. 4A. Since the driving coil 22 is applied with a driving current of large amplitude and an energizing current of small amplitude, the rotor 10 is subjected to an increased driving torque and, thereby, rotates at an increased speed. Thus, it may be possible to decrease the duration of the driving pulse during reverse rotation of the rotor 10 to a level less than that of the driving pulse applied during normal rotation of the rotor 10.

Figure 4B:
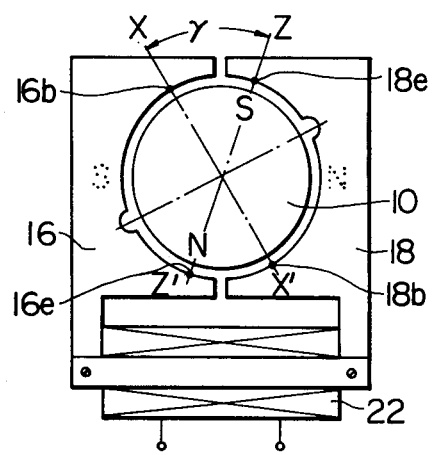
Figure 4C:
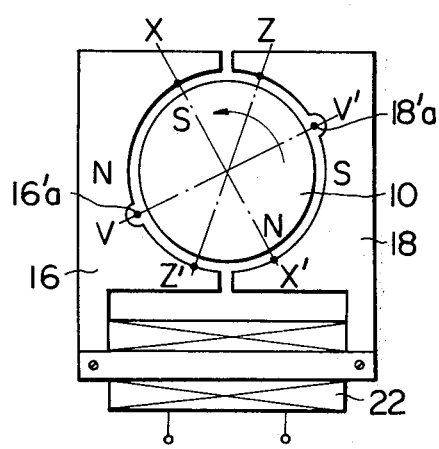

When the supply of the driving pulse 148 is stopped, a burst of high frequency pulses 152 is applied through the inverter 136 to the driving coil 22. In this condition, an energizing current of small amplitude designated as 154 flows through the driving coil 22. In this condition, the stator pole piece 16 is enrgized to a south polarity of low flux intensity and the stator pole piece 18 is energized to a north polarity of low flux intensity as shown by broken-line symbols S and N in FIG. 4B. Under this circumstance, the rotor 10 is static on the second static equilibrium axis Z–Z' as shown in FIG. 4B. If, in this situation, a $\phi1$ clock pulse is applied to the driving coil 22, the stator pole piece 16 is energized to a north polarity and the stator pole piece 18 is energized to a south polarity. At this instant, the north pole of the rotor 10 is repulsed by the north polarity of the stator pole piece 16 and attracted by the south polarity of the stator pole piece 18. At the same time, the south pole of the rotor 10 is repulsed by the south polarity of the stator pole piece 18 and attracted by the north polarity of the stator pole piece 16. Thus, the rotor 10 is forced to rotate in the reverse direction through 180°, to the position shown in FIG. 2B. In this manner, the rotor 10 is rotated in the reverse direction by the clock pulses alternately applied to the driving coil 22.

Figure 12B:
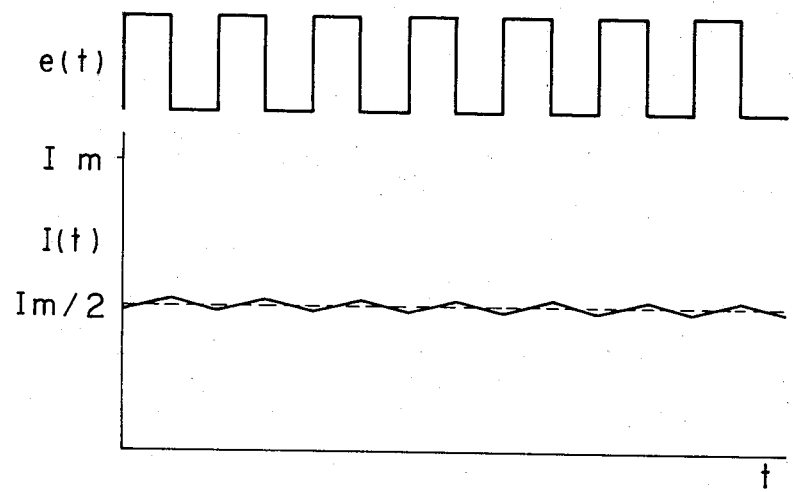

It is to be understood that there is practically no problem if a burst of high frequency pulses to be applied to the driving coil 22 has a frequency greater than 100 Hz. If, in this instance, the high frequency pulses have waveforms with 50% duty cycle, an average current flowing through the driving coil 22 can be maintained at a level $\frac{1}{2}$ the peak current Im irrespective of resistance and inductance of the driving coil and the frequency of the driving pulses being applied to the driving coil as shown in FIG. 12B. It should also be understood that it may be possible to rotate the rotor of the stepping motor in a continuous manner by combining bursts of high frequency pulses so as to provide an output pulse approximate to an alternating waveform.

It will now be appreciated from the foregoing description that according to the present invention a static equilibrium point for normal rotation of the rotor of a stepping motor can be electromagnetically shifted to at an angle $\gamma$ in a clockwise direction, by which the rotor can be rendered rotatable in the reverse direction. It should be noted that the static equilibrium point may also be shifted counter-clockwise, to increase the output torque of the motor during normal rotation thereof. It should further be understood that static equilibrium points may be electromagnetically provided both for normal rotation and reverse rotation of the rotor.

In addition, the static equilibrium angle for the rotor may be selected less than $\beta$, whereby the rotor can be rotatable in either direction. If, in this case, the static equilibrium point for the rotor is shifted during reverse rotation of the rotor, the output torque of the motor may be increased during reverse rotation of the rotor.

It will be born in mind that during reverse rotation of the rotor the power consumption will increase to a slight extent due to the use of a small energizing current. However the total power consumption is not greatly incerased, due to the low rate of application of the energizing current.

It should further be noted that the static equilibrium point for the rotor may be shifted through an angle equal to half of one step of rotation of the rotor, i.e., 90° electrical angle. It will thus be possible to shift the static equilibrium point for the rotor to any desired position to provide maximum performance efficiency.

It should be understood that the principal concept of the present invention may also be utilized for a conventional stepping motor which is rotatable only in a single direction, whereby the rotor can be rotated also in a reverse direction.

Further, if the static equilibrium angle $\alpha$ is selected to be larger than a reversible angle range $\beta$, it is possible to provide a reversible stepping motor in which even when the phase of clock pulses being applied to the driving coil of the stepping motor and the poles of the rotor are brought out of correspondence due to incorrect operation, the rotor is prevented from being undesirably rotated in a reverse direction. A mechanical reverse rotation preventive mechanism is therefore not needed.

Furthermore, a control switch forming part of a control unit according to the present invention may be connected in conjunction with an external control member such as a switch for an electronic timepiece and utilized for correcting hours, minutes or seconds of the timepiece. In this case, the driving coil of the stepping motor may be arranged to receive time correction pulses of a relatively high frequency, to perform rapid time correction. In addition, the stepping motor of the present invention may be arranged to receive rapid time correction pulses from a memory circuit in which the positions of hours hand, minutes hand and seconds hand are stored, whereby these hands can be quickly set to correct the current time.

While the present invention has been shown and described with reference to a particular embodiment, it should be noted that various other changes or modifications may be made without departing from the scope of the present invention. For example, the control unit may be modified such that a low energizing current is applied to a driving coil of a stepping motor by applying thereto an energizing pulse of the phase different from that of a driving pulse and of duration less than that of the driving pulse.

What is claimed is:

1. A stepping motor comprising a permanent magnet rotor, a stator including a driving coil and stator pole pieces electromagnetically connected thereto, said stator having at least one static equilibrium point at which said rotor is stable, and a control unit electrically connected to said driving coil, said control unit including means for energizing said driving coil to electromagnetically shift the static equilibrium position to a predetermined position.

2. A stepping motor according to claim 1, in which said rotor is rotatable in a reverse direction from said predetermined position.

3. A stepping motor according to claim 1, in which said stator pole pieces have indents formed on inner peripheries thereof at diametrically symmetric positions to provide maximum magnetic flux reluctance at an axis of said diametrically symmetric position, whereby said static equilibrium position is provided on an axis at substantially 90 degrees with respect to the axis of said diametrically symmetric positions.

4. A stepping motor according to claim 1, in which said static equilibrium position is shifted within a range between 0 to $\frac{1}{2}$ step of rotation of said rotor.

5. A stepping motor according to claim 1, further comprising a driver circuit connected between said control unit and said driving coil.

6. A stepping motor according to claim 5, in which said driver circuit comprises first means for generating driving current of relatively high amplitude, and second means for generating energizing current of relatively low amplitude by which said stator pole pieces are energized to predetermined polarities of low flux intensity to electromagnetically shift said static equilibrium position to said predetermined position.

7. A stepping motor according to claim 6, in which said control unit is connected to a frequency signal source through a frequency converter which provides a first train of pulses, and in which said means of said control unit comprises pulse generation means coupled to said frequency converter for generating a second train of pulses in differing phases at a frequency lower than that of said first train of pulses, said first means of said driver circuit being responsive to said second train of pulses for generating said driving current, and said second means of said driver circuit being responsive to said first train of pulses for generating said energizing current.

8. A stepping motor according to claim 7, in which said means of said control unit further comprises first switching means connected between said pulse generation means and said first means of said driver circuit, and second switching means connected between said frequency converter and said second means of said driver circuit.

9. A stepping motor according to claim 8, in which said means of said control unit further comprises a controfl switch connected to said first and second switching means for controlling the operations thereof.

10. A stepping motor according to claim 9, in which said control switch normally enables said first switching means to pass said second train of pulses to said first means of said driver circuit and is operable to enable said second switching means to pass said first train of pulses to said second means of said driver circuit.

11. A stepping motor according to claim 6, in which said first and second means comprise transistors, respectively, the transistors of said second means having high output resistances and adapted to be rendered conductive in response to said first train of pulses to generate said energizing current.

12. A stepping motor according to claim 5, in which said driver circuit comprises gate means having first and second inputs and an output coupled to said driving coil.

13. A stepping motor according to claim 12, in which said control unit is connected to a frequency signal source through a frequency converter which generates a first train of pulses, and in which said control unit comprises first pulse generating means connected to said frequency converter for generating a second train of pulses in differing phases at a frequency lower than that of said first train of pulses, and second pulse generating means connected to said frequency converter for generating a third train of pulses at a frequency higher than that of said first train of pulses, said first and second inputs of said gate means being connected to outputs of said first and second pulse generating means, respectively, said gate means generating a driving current of high amplitude for driving said rotor in response to said second train of pulses and generating energizing current of low amplitude in response to said third train of pulses for electromagnetically shifting said static equilibrium position to said predetermined position.

14. A stepping motor according to claim 13, in which said means of said control unit further comprises first switching means connected between said first pulse generating means and said first input of said gate means, and second switching means connected between said second pulse generating means and said second input of said gate means.

15. A stepping motor according to claim 14, in which said control unit further comprises a control switch operatively connected to said first and second switching means, said control switch normally rendering said first switching means operative to pass said second train of pulses to said driver circuit and being operable to render said switching means to pass said third train of pulses to said driver circuit.

16. A stepping motor according to claim 15, in which said second switching means comprises gate means having its inputs connected to receive said first train of pulses and said third train of pulses to generate a burst of high frequency pulses corresponding to the product of said first train of pulses and said third train of pulses, said gate means of said driver circuit being responsive to said burst of high frequency pulses to generate energizing current of low amplitude whereby said stator pole pieces are energized to predetermined polarities of low flux intensity for electromagnetically shifting said static equilibrium position to said predetermined position.

17. A stepping motor according to claim 16, in which said burst of high frequency pulses has a frequency greater than 100 Hz.

* * * * *